United States Patent [19]
Moore

[11] Patent Number: 4,799,711
[45] Date of Patent: Jan. 24, 1989

[54] TOW BAR AND METHOD OF USE THEREOF

[76] Inventor: Dale C. Moore, Rte. 1, Box 63, Griggsville, Ill. 62340

[21] Appl. No.: 131,721

[22] Filed: Dec. 11, 1987

[51] Int. Cl.$^4$ ............................................. B62D 13/04
[52] U.S. Cl. .................................. 280/444; 280/481; 280/491 A; 280/491 B
[58] Field of Search ........... 280/481, 492, 493, 491 R, 280/491 A, 491 B, 491 C, 491 D, 491 E, 444, 482, 292; 180/215

[56] References Cited

U.S. PATENT DOCUMENTS

| | | | |
|---|---|---|---|
| 1,603,931 | 10/1926 | Amundson | 280/491 R |
| 2,629,611 | 2/1953 | Covington | 280/292 |
| 3,785,678 | 1/1974 | Shearer | 280/491 B |
| 4,273,352 | 6/1981 | Jorgenson | 280/481 |
| 4,573,550 | 3/1986 | Inomata et al. | 180/215 |

Primary Examiner—John A. Pekar
Attorney, Agent, or Firm—Edward R. Weber

[57] ABSTRACT

The present invention relates to a tow bar which can be removably attached to the towed unit and is comprised of a mounting bracket assembly and a tow bar/tie rod assembly; which tow bar can be conveniently stored when not in use, is lightweight yet sturdy, and can be easily attached to the towing unit by a single person.

18 Claims, 2 Drawing Sheets

TOW BAR AND METHOD OF USE THEREOF

FIELD OF THE INVENTION

The present invention relates to trailer hitches and tow bars, and more particularly, to tow bars which are removably attached to the towed unit. The novel device allows for ease of attachment to the towing unit, convenient storage of the device when not in use, and simple construction which allows the device to be both lightweight and sturdy.

BACKGROUND OF THE INVENTION

In the past, farmers, ranchers, construction workers, and other individuals who require heavy or large equipment at remote job sites have faced the problem of transportation back from that job site. Since return of the heavy or large equipment to a "home" location at the end of the work day is usually cost and time prohibitive, the situation requires that either a minimum of two individuals and two vehicles, one of which can deliver the individuals back to the home location be sent to the job site, a pick-up service be instituted if only one person is required at the job site, or some other equally inconvenient method be devised. Since oftentimes two individuals are not required at a job site, especially in the case of farmers or ranchers, the situation has often been remedied by towing a second vehicle.

Various hitches and tow bars have been devised to facilitate the towing of the second vehicle. However, problems are oftentimes encountered with these hitches and tow bars. Some of these problems include that the hitches are cumbersome to install and use, that they are cumbersome to remove and/or store when not in use, and that the hitching process creates alignment problems between the towing unit and the towed vehicle which are not easily solvable by a single individual. An additional concern is the positive tracking of the towed vehicle to the towing unit.

It is therefore an object of the present invention to provide a hitch and tow bar which can be universally mounted. It is a further object of the invention to provide a hitch and tow bar which are easily installed and used as well as easily removed and/or stored. A final object of the invention is to provide a hitch and tow bar which are simple in construction and lightweight, yet sturdy. Other objects and features will be in part apparent and in part pointed out hereinafter.

The invention accordingly comprises the product and method hereinafter described, the scope of the invention being indicated in the following claims.

SUMMARY OF THE INVENTION

The present invention is attached to a conventional luggage rack which has been affixed to the front end of an all terrain vehicle (ATV), in particular, or other lightweight vehicle as desired, to allow the ATV to be towed behind a piece of large or heavy equipment. It is simple in construction requiring a mounting bracket/stabilizer assembly, a handle bar attachment bracket, a storage bracket, and a tow bar/tie rod assembly. The device is constructed of any of numerous known materials which are capable of withstanding the relatively low stress associated with towing a lightweight vehicle.

The mounting bracket of the instant device is attached to the luggage rack with "U" shaped bolts in such manner that the stabilizer can also be attached to the rack to reduce twisting of the mounting bracket. In use, the mounting bracket receives the pivot shaft of the tow bar/tie rod assembly which attaches to the towing vehicle.

The handle bar attachment bracket is attached to the handle bar of the ATV or other towed vehicle and receives the tie rod of the tow bar/tie rod assembly and provides for positive steering when the ATV or other lightweight vehicle is being towed.

The storage bracket is attached to the luggage rack affixed to the ATV or other towed vehicle at a location spaced apart from the mounting bracket. When not in use, the tow bar/tie rod assembly may be stored conveniently on the towed vehicle with this bracket.

The tow bar/tie rod assembly consists of a pivot shaft, a plurality of telescoping bars, a clevis and pin or other mechanism for attaching the tow bar to the towing vehicle, and a tie rod. The pivot shaft of the tow bar/tie rod assembly is sized to be received by the mounting bracket attached to the luggage rack and is held in place by a locking means, such as a cotter pin, inserted perpendicularly to the longitudinal axis of the pivot shaft beneath the mounting bracket. This pivot shaft is attached to the telescoping tow bar by a yoke which permits the tow bar to move freely in a vertical plane. The tow bar is composed of a plurality of telescoping bars, which can be extended to provide the desired separation between the towing and towed vehicles or telescoped to permit storage. An attaching means, such as a clevis and pin, is attached to the end of the tow bar furthest from the pivot shaft. The tie rod is attached to the tow bar/tie rod assembly near the pivot shaft in such manner that rotation of the tow bar about the pivot shaft will be communicated through the tie rod to the handle bar attachment bracket mounted on the handle bar of the ATV and will thus serve to steer the ATV and cause it to follow the towing vehicle without unacceptable sway from side to side. In one embodiment, the tie rod will be obtusely angled such that the free end of the tie rod and the handle bar of the ATV will meet in a perpendicular relationship and the first end attached to the tow bar will be in near perpendicular relationship with the tow bar thereby providing the positive steering desired.

BRIEF DESCRIPTION OF THE DRAWINGS

In the accompanying drawings, in which one of various possible embodiments of the invention is illustrated.

DETAILED DESCRIPTION OF THE DRAWINGS

Figure 1:
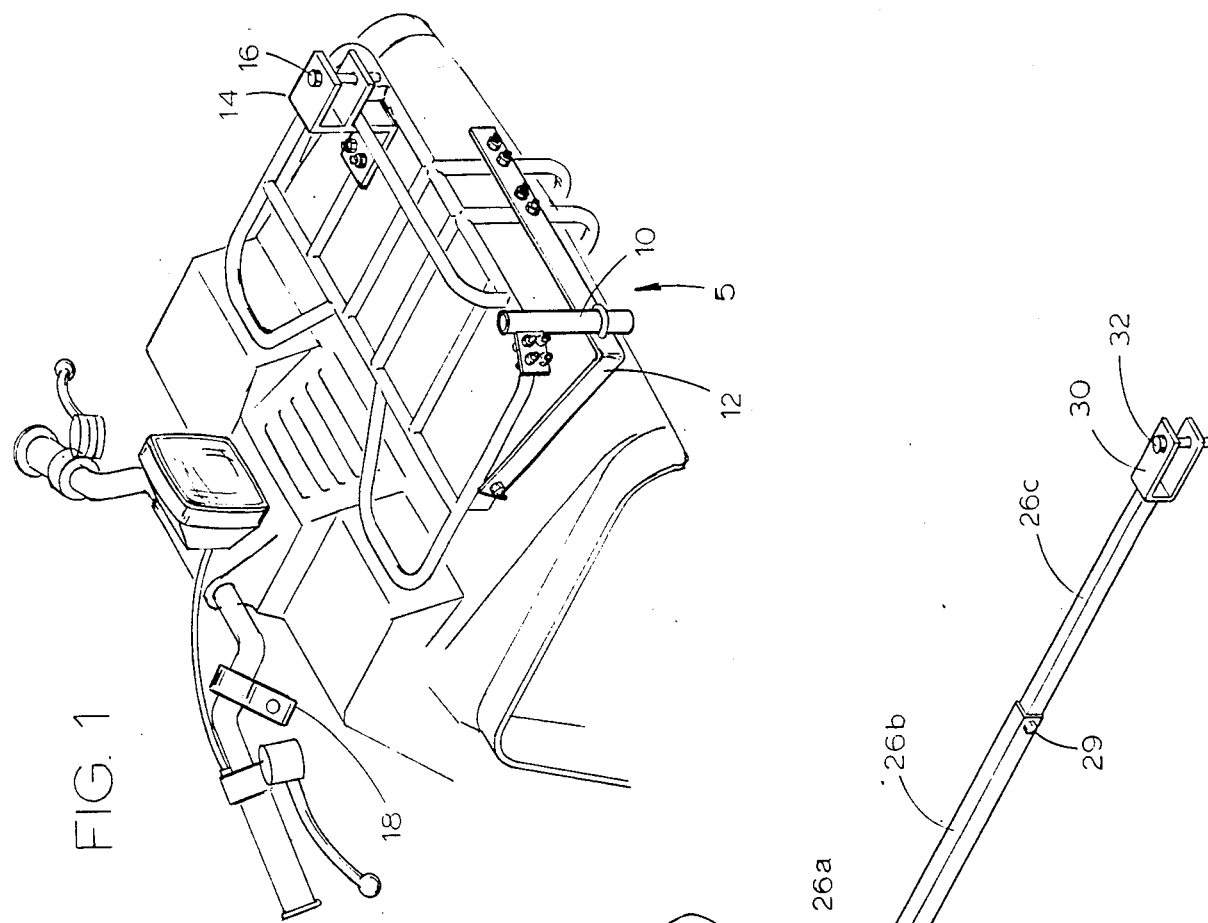
FIG. 1 shows the front structure of an all terrain vehicle with a luggage rack permanently attached thereto and the mounting bracket/stabilizer assembly and storage bracket of applicant's unique invention semi-permanently mounted onto the luggage rack.

Referring now to the drawings wherein like reference characters represent like elements, FIG. 1 shows mounting bracket/stabilizer assembly 5 and storage bracket 14 semi-permanently mounted onto the luggage rack affixed to an all terrain vehicle (ATV) by conventional mounting means. Mounting bracket/stabilizer assembly 5 consists of mounting bracket 10 and stabilizer bar 12. Stabilizer bar 12 is designed relative to the configuration of the ATV and maintains mounting bracket 10 in an essentially vertical orientation relative to the vehicle. In a preferred embodiment, mounting bracket 10 constitutes a tubular member which is attached to the ATV by a semi-permanent mounting means, such as bolting. Storage bracket 14 is a clevis which is attached by conventional means to the luggage rack on the ATV. Storage bracket 14 accepts the telescoping bar o applicant's unique device for storage when the tow bar is not in use. A locking pin 16 retains the tow bar in the stored position. Handle bar attachment bracket 18 is attached to the handle bar of the ATV. The function of handle bar attachment bracket 18 will be discussed later.

Figure 2:
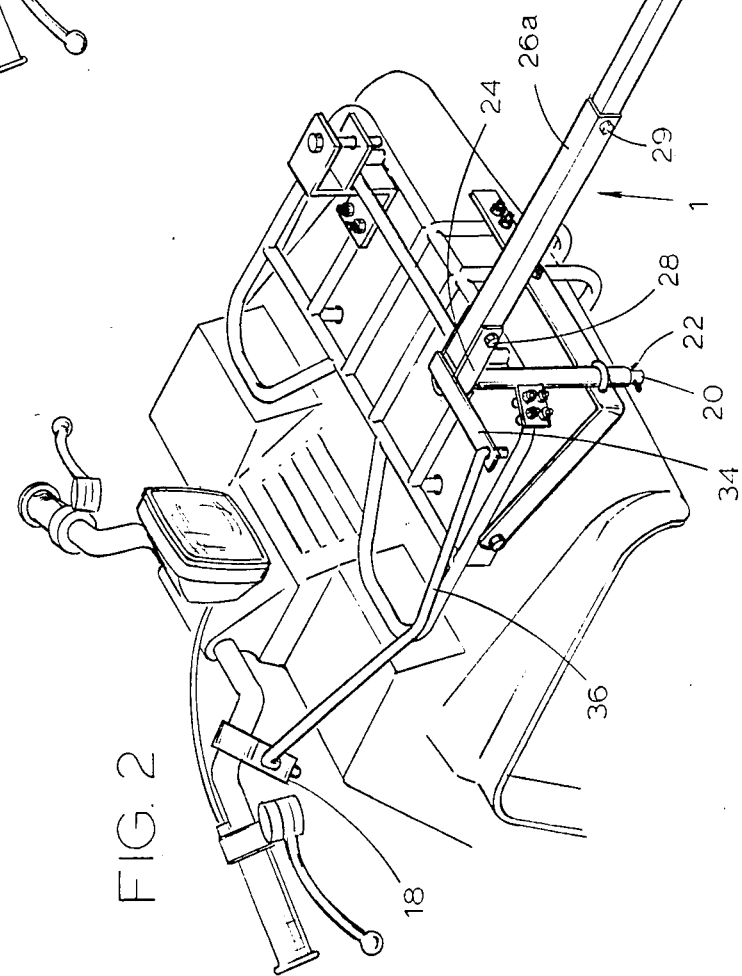
FIG. 2 shows the tow bar of applicant's unique invention assembled and ready for attachment to a towing vehicle.
Figure 3:
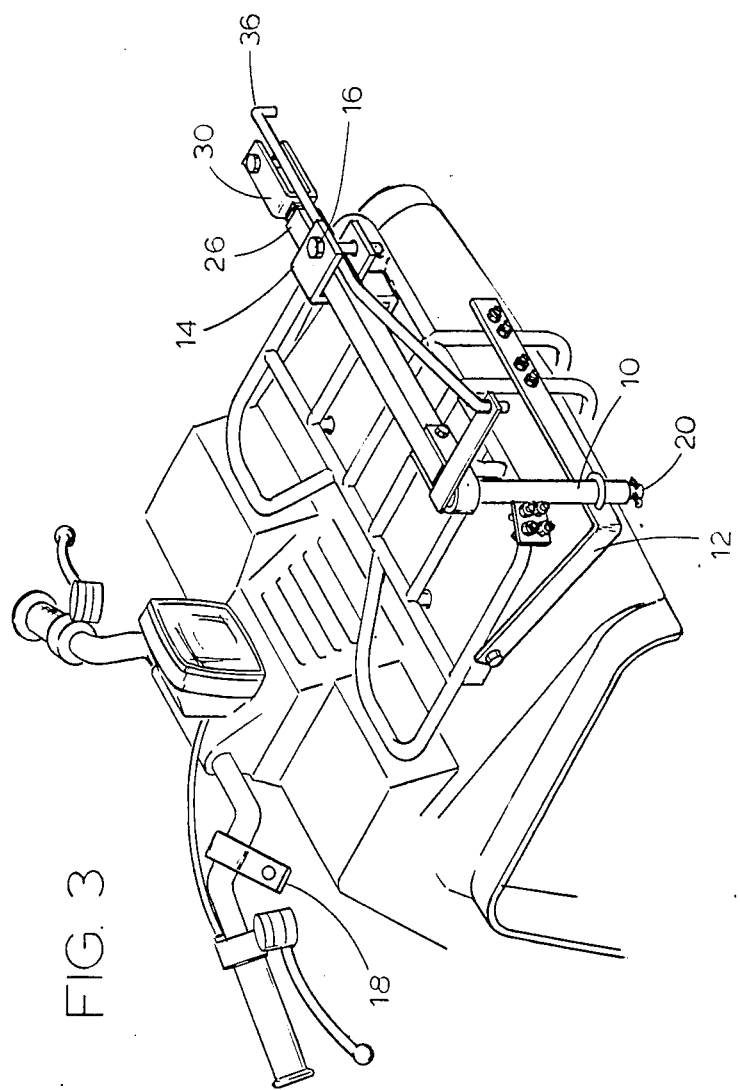
FIG. 3 shows the tow bar of applicant's unique invention in its stored condition on the front of an all terrain vehicle.

FIG. 2 shows tow bar/tie rod assembly 1 installed into mounting bracket 10. In a preferred embodiment, pivot shaft 20 of tow bar/tie rod assembly 1 is a cylindrical member sized to rotatably mate with mounting bracket 10 and is held in position by lock pin 22. Lock pin 22 may be a bolt, cotter pin, or other known means of preventing one member from being withdrawn from another member. Yoke 24 is rigidly attached to pivot shaft 20 at the end opposite from lock pin 22. Yoke 24 may be attached to pivot shaft 20 by any means capable of providing a rigid attachment, such as welding, bolting, or riveting. Extendable bar 26 is attached to yoke 24 by means of pivot pin 28. Pivot pin 28 permits extendable bar 26 to accommodate any differences in height between the hitch or tow plate attached to the towing vehicle (not shown) and yoke 24. Extendable bar 26 is composed of a plurality of telescoping sections. In the instant drawings, three telescoping segments 26a, 26b, and 26c are shown. Each telescoping segment is sized to fit within the preceding one to permit the tow bar to be shortened to the approximate width of the ATV for storage, as shown in FIG. 3. In use, telescoping segments 26a, 26b, and 26c are pulled to full extension and held in position by a plurality of locking pins 29. Final telescoping segment 26c terminates in a tow attachment, such as clevis 30. In use, clevis 30 would be attached to the hitch or tow plate affixed to the towing vehicle and held in place by a clevis pin 32. A steering bar 34 is also rigidly attached to yoke 24 and pivot shaft 20. Steering bar 34 is connected by tie rod 36 to handle bar attachment bracket 18. In use, when clevis 30 moves in a horizontal plane, steering bar 34 will be caused to rotate around the central axis of mounting bracket 10 and will in turn act through tie rod 36 to move the handle bars of the ATV thereby causing the wheel of the ATV to positively track in the direction in which clevis 30 has moved.

FIG. 3 shows tow bar/tie rod assembly 1 in the stored position. In use, clevis 30 is detached from the towing vehicle (not shown) and tie rod 26 is detached from handle bar attachment bracket 18. Telescoping segment 26c is then received into telescoping segment 26b, both of which are received by telescoping segment 26a. Extendable bar 26, which is composed of telescoping segments 26a, 26b, and 26C is then rotated via pivot shaft 20 within mounting bracket 10 and mates with storage bracket 14. Rotation of pivot shaft 20 causes steering bar 34 to move in a horizontal plane such that tie rod 36 may be rotated and mated with storage bracket 14. Extendable bar 26 and tie rod 36 are then secured within storage bracket 14 by locking pin 16. In a preferred embodiment, expendable bar 26 and tie rod 36 will be essentially the same width as the ATV.

In use, the person who is moving the heavy or large equipment to a remote job site would drive the ATV or other vehicle to be towed behind the heavy or large equipment. The tow bar/tie rod assembly would be released from the storage bracket and rotated into alignment with the hitch of the heavy or large equipment. The tow bar would be extended its full length and the extensions locked in position. The tow bar would then be attached to the hitch on the heavy or large equipment. The tie bar would then be attached to the handle bar of the ATV or other vehicle at the handle bar attachment bracket and secured. The user would then be able to tow the ATV or other lightweight vehicle to the remote job site and release the towed vehicle from the towing unit by reversing the procedure.

As will be apparent from examination of the drawings and the accompanying description, the present invention will provide farmers, ranchers, construction workers, and other individuals who require transportation back from a remote job site with a tow bar which can be easily and safely employed, which can be easily assembled and disassembled by one individual, and which is conveniently stored in such a manner that the luggage rack is accessible and usable. Likewise, it can be easily attached and removed from the towed vehicle, as desired.

In one embodiment, the present invention is constructed of materials which will allow a vehicle of up to six hundred fifty pounds to be towed at a maximum speed of twenty-five miles per hour and will weigh four pounds. However, as various changes could be made in the above product without departing from the scope of the invention, it is intended that all matter contained in the above description or shown in the accompanying drawings shall be interpreted as illustrative and not in a limiting sense.

What is claimed is:

1. A tow bar mechanism suitable for towing a lightweight vehicle behind a towing vehicle, said tow bar mechanism comprising a mounting bracket assembly, a tow bar/tie rod assembly, and a steering mechanism attachment bracket; said mounting bracket assembly being installed on the front end of said towed vehicle; said tow bar/tie rod assembly being pivotally mounted in said mounting bracket assembly such that said tow bar may be engaged with said towing vehicle, said tow bar consisting of telescoping sections having relationship to each other such that when said tow bar is fully extended, it has a length sufficient to maintain desired separation between said towed vehicle and said towing vehicle and when it is fully telescoped, it may be conveniently rotated and stored on the towed vehicle thus permitting the towed vehicle to be operated without the necessity of removing the tow bar/tie rod assembly from the vehicle; and said steering mechanism attachment bracket being suitably mounted on the steering mechanism of said towed vehicle such that said bracket may receive the free end of the tie rod portion of said tow bar/tie rod assembly and permit positive steering of said towed vehicle such that the relationship between said towed vehicle and said towing vehicle will be maintained.

2. A tow bar mechanism according to claim 1 wherein a storage bracket is suitably mounted on the front end of said towed vehicle at a point spaced apart from said mounting bracket assembly such that said storage bracket will receive the free end of said tow bar when in its telescoped condition and permit said tow bar/tie rod assembly to be stored when not in use, thereby permitting the towed vehicle to be operated without the necessity of removing the tow bar/tie rod assembly from said towed vehicle.

3. A toe bar mechanism according to claim 2, wherein said tow bar/tie rod assembly consists of a pivot shaft, a yoke, a plurality of telescoping tubes, an attachment means, and a tie rod assembly; said pivot shaft being sized to pivotally mate with said mounting bracket assembly, said pivot shaft being maintained in position within said mounting bracket assembly by an attachment pin which has been inserted perpendicularly to the longitudinal axis of said pivot shaft, and said pivot shaft further being attached to the first end of the first of said plurality of telescoping tubes by a yoke, which yoke permits said plurality of telescoping tubes to move freely in a vertical plane containing the longitudinal axis of said pivot shaft; said plurality of telescoping tubes being extendable to maintain suitable distance between said towed vehicle and said towing vehicle, said plurality of telescoping tubes being fixed in the extended condition by a plurality of removable locking pins, said plurality of telescoping tubes further being capable of being telescoped to a shortened condition suitable for storing within said storage bracket, and a second end on the final tube of said plurality of telescoping tubes is equipped with said attachment means; said attachment means being suitable for attaching a towed vehicle to a towing vehicle; and said tie rod assembly comprising a tie rod and a steering bar wherein a first end of said tie rod is attached to said pivot shaft/yoke assembly via said steering bar and a second end of said tie rod is attached to said steering mechanism attachment bracket, whereby rotation of said tow bar about the longitudinal axis of said pivot shaft is communicated through said tie rod assembly to said steering mechanism of said towed vehicle thus causing said towed vehicle to positively follow said towing vehicle.

4. A tow bar mechanism according to claim 3 wherein said mounting bracket assembly, said steering mechanism attachment bracket, and said storage bracket are semi-permanently mounted onto said towed vehicle.

5. A tow bar mechanism according to claim 1 wherein said mounting bracket assembly consists of a hollow, cylindrical mounting bracket affixed to a stabilizer assembly which is suitably installed on the front end of said towed vehicle such that the axis of said hollow, cylindrical mounting bracket will be maintained in a substantially vertical alignment so as to permit said tow bar/tie rod assembly to move freely in a substantially horizontal plane.

6. A tow bar mechanism according to claim 5 wherein a steering mechanism attachment bracket is suitably mounted on the steering mechanism of said towed vehicle such that said bracket may receive the free end of the tie rod portion of said tow bar/tie rod assembly and permit positive steering of said towed vehicle such that the relationship between said towed vehicle and said towing vehicle will be maintained.

7. A tow bar mechanism according to claim 6 wherein the tow bar portion of said tow bar/tie rod assembly is composed of telescoping sections having relationship to each other such that when said tow bar is fully extended, it has a length sufficient to maintain desired separation between said towed vehicle and said towing vehicle, and when it is fully telescoped, it may be conveniently rotated and stored on the towed vehicle thus permitting the towed vehicle to be operated without the necessity of removing the tow bar/tie rod assembly from the vehicle.

8. A tow bar mechanism according to claim 7 wherein a storage bracket is suitably mounted on the front end of said towed vehicle at a point spaced apart from said mounting bracket assembly such that said storage bracket will receive the free end of said tow bar when in its telescoped condition and permit said tow bar/tie rod assembly to be stored when not in use, thereby permitting the towed vehicle to be operated without the necessity of removing the tow bar/tie rod assembly from said towed vehicle.

9. A tow bar mechanism according to claim 8 wherein said tow bar/tie rod assembly consists of a pivot shaft, a yoke, a plurality of telescoping tubes, an attachment means, and a tie rod assembly; said pivot shaft being sized to pivotally mate with a hollow, cylindrical mounting bracket of said mounting bracket assembly, said pivot shaft being maintained in position within-said mounting bracket assembly by an attachment pin which has been inserted perpendicularly to the longitudinal axis of said pivot shaft, and said pivot shaft further being attached to the first end of the first of said plurality of telescoping tubes by a yoke, which yoke permits said plurality of telescoping tubes to move freely in a vertical plane containing the longitudinal axis of said pivot shaft; said plurality of telescoping tubes being extendable to maintain a suitable distance between said towed vehicle and said towing vehicle, said plurality of telescoping tubes being fixed in the extended condition by a plurality of removable locking pins, said plurality of telescoping tubes further being capable of being telescoped to a shortened condition suitable for storing within said storage bracket, and a second end on the final tube of said plurality of telescoping tubes is equipped with attachment means; said attachment means being suitable for attaching a towed vehicle to a towing vehicle; and said tie rod assembly comprising a tie rod and a steering bar wherein a first end of said tie rod is attached to said pivot shaft/yoke assembly via said steering bar and a second end of said tie rod is attached to said steering mechanism attachment bracket whereby rotation of said tow bar about the longitudinal axis of said pivot shaft is communicated through said tie rod assembly to said steering mechanism of said towed vehicle thus causing said towed vehicle to positively follow said towing vehicle.

10. A tow bar mechanism according to claim 9 wherein said mounting bracket assembly, said steering mechanism attachment bracket, and said storage bracket are semi-permanently mounted onto said towed vehicle.

11. A tow bar mechanism suitable for towing an all terrain vehicle behind a towing vehicle, which all terrain vehicle has a front mounted luggage rack, said tow bar mechanism comprising a mounting bracket/stabilizer assembly, a handle bar attachment brackets, a storage bracket, and a telescoping tow bar/tie rod assembly; said mounting bracket/stabilizer assembly being installed on the luggage rack attached to the front end of said all terrain vehicle; said handle bar attachment bracket being mounted on the handle bar of said all terrain vehicle; said storage bracket being mounted on said luggage rack at a location spaced apart from said mounting bracket/stabilizer assembly; and said telescoping tow bar/tie rod assembly being pivotally mounted in said mounting bracket/stabilizer assembly such that said tow bar may be extended and engaged with said towing vehicle when in use or collapsed and contained within said storage bracket when said tow bar is not in use.

12. A tow bar mechanism according to claim 11 wherein said mounting bracket/stabilizer assembly consists of a hollow, cylindrical mounting bracket affixed to a stabilizer bracket, which mounting bracket/stabilizer assembly is installed on the luggage rack attached to the front end of said all terrain vehicle such that the longitudinal axis of said hollow, cylindrical mounting bracket will be maintained in a substantially vertical position.

13. A tow bar mechanism according to claim 12 wherein said handle bar attachment bracket is suitably mounted on the handle bar of said all terrain vehicle such that said bracket may receive a first end of the tie rod portion of said telescoping tow bar/tie rod assembly and permit positive steering of said all terrain vehicle such that the relationship between said all terrain vehicle and said towing vehicle will be maintained.

14. A tow bar mechanism according to claim 13 wherein said telescoping tow bar/tie rod assembly consists of a pivot shaft, a yoke, a plurality of telescoping tubes, and a tie rod assembly; said pivot shaft being sized to pivotally mate with said hollow, cylindrical mounting bracket of said mounting bracket/stabilizer assembly, said pivot shaft being maintained in position within said hollow, cylindrical mounting bracket of said mounting bracket/stabilizer assembly by an attachment pin which has been inserted perpendicularly to the longitudinal axis of said pivot shaft, and said pivot shaft further being attached to the first end of the first of said plurality of telescoping tubes by a yoke, which yoke permits said plurality of telescoping tubes to move freely in a vertical plane, which vertical plane substantially includes the longitudinal axis of said pivot shaft; said plurality of telescoping tubes being extendable to maintain suitable distance between said all terrain vehicle and said towing vehicle, said plurality of telescoping tubes being held in the extended condition by a plurality of removable locking pins, the final tube of said plurality of telescoping tubes having a second end with an attachment means suitable for attaching said all terrain vehicle to said towing vehicle, and said plurality of telescoping tubes further being capable of telescoping one into the other to accomplish a significant reduction in overall length, which reduction in length permits said tow bar/tie rod assembly to be stored within said storage bracket when in said telescoped condition; and said tie rod portion of said tow bar/tie rod assembly comprising a tie rod and a steering bar, said tie rod having a first end attached to said handle bar attachment bracket and a second end attached to said steering bar, which steering bar is fastened to said yoke, such that rotation of said tow bar about the longitudinal axis of said pivot shaft will be communicated through said steering bar and said tie rod to said handle bar of said all terrain vehicle thereby causing said all terrain vehicle to positively follow said towing vehicle.

15. A tow bar mechanism according to claim 14 wherein said mounting bracket/stabilizer assembly, said steering mechanism attachment bracket, and said storage bracket are semi-permanently mounted onto said towed vehicle.

16. A tow bar mechanism suitable for towing an all terrain vehicle behind a towing vehicle, which all terrain vehicle has a front mounted luggage rack, said tow bar mechanism comprising a mounting bracket/stabilizer assembly, a handle bar attachment bracket, a storage bracket, and a telescoping tow bar/tie rod assembly wherein said mounting bracket/stabilizer assembly, said handle bar attachment bracket, and said storage bracket are semipermanently mounted onto said towed vehicle; said mounting bracket/stabilizer assembly being installed on the luggage rack attached to the front end of said all terrain vehicle; said handle bar attachment bracket being mounted on the handle bar of said all terrain vehicle; said storage bracket being mounted on said luggage rack at a location spaced apart from said mounting bracket/stabilizer assembly; and said telescoping tow bar/tie rod assembly being pivotally mounted in said mounting bracket/stabilizer assembly such that said telescoping tow bar portion of said tow bar/tie rod assembly may be extended and engaged with said towing vehicle when in use or collapsed and contained within said storage bracket when said tow bar portion is not in use.

17. A method of towing an all terrain vehicle behind a towing vehicle, which all terrain vehicle has a front mounted luggage rack, a mounting bracket/stabilizer assembly mounted upon said luggage rack, and a handle bar attachment bracket mounted upon the handle bar of said all terrain vehicle, which method comprises the steps of: (1) mating a telescoping tow bar/tie rod assembly with said mounting bracket/stabilizer assembly, which tow bar/tie rod assembly consists of a tow bar having a first end attached to a pivot mechanism designed to mate with said mounting bracket/stabilizer assembly and a second end equipped with means for attachment to said towing vehicle, said tow bar/tie rod assembly further being equipped with a tie rod having a first end attached to said tow bar/tie rod assembly in proximity to said pivot mechanism, wherein said tow bar/tie rod assembly is mated with said mounting bracket/stabilizer assembly, and a second end adapted to be attached to said handle bar attachment bracket; (2) fastening said tow bar/tie rod assembly in said mounting bracket/stabilizer assembly so as to prevent it from becoming unintentionally detached therefrom; (3) connecting said second end of said tie rod to said handle bar attachment bracket; and (4) attaching said second end of said tow bar to said towing vehicle whereby when said towing vehicle is operated, the tow bar will maintain the desired separation between said all terrain vehicle and said towing vehicle and said tie rod will control the steering mechanism of said all terrain vehicle so that said all terrain vehicle will positively follow behind said towing vehicle.

18. A method of towing an all terrain vehicle behind a towing vehicle according to claim 17 wherein the tow bar portion of the tow bar/tie rod assembly comprises a plurality of telescoping tubes, which tubes may be locked in an extended condition to maintain desired separation between said towing vehicle and said all terrain vehicle, or which tubes may alternatively be telescoped into a retracted condition thereby significantly shortening the length of said tow bar portion and thus permitting said second end of said tow bar to be attached to a storage bracket mounted upon said luggage rack of said all terrain vehicle, which storage bracket is spaced apart from said mounting bracket/stabilizer assembly, whereby the reduced length tow bar/tie rod assembly may be left mounted upon said all terrain vehicle during those times when said all terrain vehicle is operated independently from the towing vehicle.

* * * * *